United States Patent
Liu et al.

(10) Patent No.: US 12,462,200 B1
(45) Date of Patent: Nov. 4, 2025

(54) ACCELERATED TRAINING OF A MACHINE LEARNING MODEL

(71) Applicant: Pinterest, Inc., San Francisco, CA (US)

(72) Inventors: Xi Liu, San Mateo, CA (US); Jiajing Xu, Palo Alto, CA (US); Erzhuo Wang, San Carlos, CA (US)

(73) Assignee: Pinterest, Inc., San Francisco, CA (US)

( * ) Notice: Subject to any disclaimer, the term of this patent is extended or adjusted under 35 U.S.C. 154(b) by 1204 days.

(21) Appl. No.: 17/325,936

(22) Filed: May 20, 2021

(51) Int. Cl.
 *G06N 20/20* (2019.01)
 *G06F 18/21* (2023.01)
 *G06F 18/214* (2023.01)
 *G06N 3/045* (2023.01)

(52) U.S. Cl.
 CPC ......... *G06N 20/20* (2019.01); *G06F 18/2148* (2023.01); *G06F 18/217* (2023.01); *G06N 3/045* (2023.01)

(58) Field of Classification Search
 CPC .... G06N 3/045; G06N 20/20; G06F 18/2148; G06F 18/217
 See application file for complete search history.

(56) References Cited

U.S. PATENT DOCUMENTS

| | | | | |
|---|---|---|---|---|
| 11,195,084 | B1* | 12/2021 | Wu | G06N 3/044 |
| 11,568,205 | B1* | 1/2023 | Nair | G06N 3/084 |
| 11,853,401 | B1* | 12/2023 | Nookula | G06F 18/2163 |
| 2020/0250583 | A1* | 8/2020 | Hammond | G06F 3/0482 |
| 2020/0293009 | A1* | 9/2020 | Quirynen | G05B 13/041 |
| 2021/0056378 | A1* | 2/2021 | Yang | G06N 3/082 |
| 2021/0081841 | A1* | 3/2021 | Sikka | G06N 3/045 |
| 2021/0097443 | A1* | 4/2021 | Li | G06N 5/04 |
| 2021/0110313 | A1* | 4/2021 | Jones | G06F 18/214 |
| 2021/0174210 | A1* | 6/2021 | Hsyu | G06N 3/082 |
| 2021/0182659 | A1* | 6/2021 | Makhija | G06V 30/147 |
| 2021/0304056 | A1* | 9/2021 | Qi | G06F 17/00 |
| 2021/0326751 | A1* | 10/2021 | Liu | G06N 3/084 |
| 2022/0055651 | A1* | 2/2022 | Baric | G05D 1/646 |
| 2022/0114449 | A1* | 4/2022 | Wu | G06N 3/08 |
| 2022/0180146 | A1* | 6/2022 | Saxena | G06N 3/006 |
| 2022/0215252 | A1* | 7/2022 | Varno | G06N 3/047 |
| 2022/0327390 | A1* | 10/2022 | Wilhelm | G06N 3/084 |

OTHER PUBLICATIONS

Huang et al., "Accelerating Recurrent Neural Network Training via Two Stage Classes and Parallelization," 2013, pp. 326-331. (Year: 2013).*

(Continued)

*Primary Examiner* — Eric J. Bycer
(74) *Attorney, Agent, or Firm* — Haynes and Boone, LLP

(57) ABSTRACT

Systems and methods are presented for training a second machine learning model according to aspects of a trained first machine learning model. Processing features utilized by a training framework to train the first machine learning model are identified, and at least some of the processing features are combined with an initial set of training features to form updated training features. The updated training features are presented to a user for customization, resulting in customized training features. An executable training framework is configured with the customized training features and executed to train the second machine learning model.

20 Claims, 8 Drawing Sheets

(56) References Cited

OTHER PUBLICATIONS

Kula, Maciej, "Metadata Embeddings for User and Item Cold-start Recommendations," Jul. 30, 2015, 7 pgs. (Year: 2015).*
Howard et al., "fastai: A Layered API for Deep Learning," Feb. 16, 2020, 27 pgs. (Year: 2020).*
Wang et al., "A Practical Incremental Method to Train Deep CTR Models," Sep. 4, 2020, 8 pgs. (Year: 2020).*
Ash et al., "On Warm-Starting Neural Network Training," 34th Conference on Neural Information Processing Systems, Dec. 31, 2020, 21 pgs. (Year: 2020).*

* cited by examiner

ACCELERATED TRAINING OF A MACHINE LEARNING MODEL

BACKGROUND

More and more aspects of the digital world are implemented, determined, or assisted by machine learning. Indeed, social networks, search engines, online sellers, advertisers, and the like all regularly rely upon the services of trained machine learning models to achieve their various goals.

As will be readily appreciated by those skilled in the art, training a machine learning model requires numerous iterations over a large body of training data, where the training data is representative of typical input for a trained machine learning model. While the training data may be considered labeled or unlabeled, training the machine learning model involves numerous iterations of processing the training data, periodically determining accuracy of the processed results, updating parameters and aspects of the machine learning model to improve accuracy, and repeating the training, all to guide the machine learning model to understand the input data and generate accurate output responses. As part of updating the machine learning model, parameters may be modified, deleted and/or added. Further, processing nodes may be modified as to their operations, such as weights applied to input data, which input data items to process, etc. Ultimately, training a machine learning model to generate desired results may involve millions of training iterations over a large corpus of training data to achieve satisfactory results. Clearly, traditional training of a machine learning model takes a significant amount of time and an equally significant amount of processing bandwidth.

Once the training ends, the trained machine learning model becomes static: it accepts a specific type of input data, as determined by the training goals and training data, and generates a desired response. However, it is almost inevitable that organizations and entities that utilize trained machine learning models will subsequently want to change or modify a trained machine learning model in some manner. Indeed, it may be that the input data of a given organization or entity is updated in some meaningful way, such that it would be very important to update the trained model to reflect the update. As illustrated above, the traditional training, or re-training, of a machine learning model, unsurprisingly, takes a significant amount of time, and an equally significant amount of processing bandwidth. A problem, of course, is that at the start of training, the model has not developed any "understanding" as to how to interpret the input data or generate the desired results. In training (or retraining) a machine learning model, this "understanding" is developed through training iterations over time. Unfortunately, by the time that the new, updated machine learning model is fully trained, the input data or the need for the specific results of the to-be-trained model have evolved to something new. This creates a cycle where the trained machine learning model is always behind what is desired or available.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
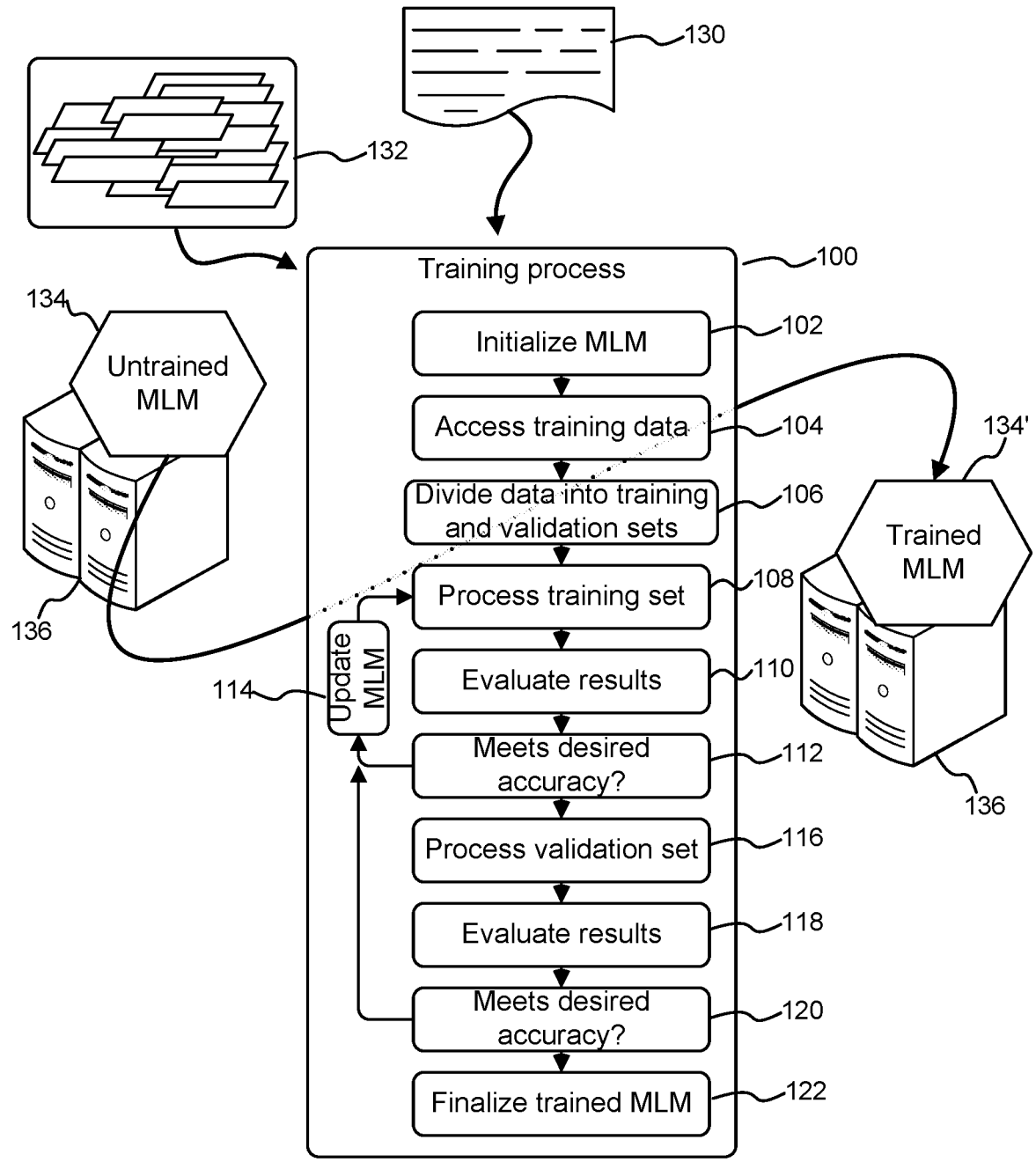
FIG. 1 illustrates an exemplary overall process for training a machine learning model, in accordance with aspects of the disclosed subject matter.

As suggested above, the typical training of a machine learning model to accurately generate desired results for input data takes significant training efforts. Indeed, typical training requires a large corpus of training data (using supervised or unsupervised training data, also referred to as labeled or unlabeled training data, or a blend of the two) and requires numerous training iterations, often counting into the millions of training iterations. Simply put, typical training methods take a significant amount of time, during which new goals and objectives might be generated for the to-be-trained machine learning model, and/or the corpus of training data may be updated to include new information or aspects which may lead back to new, updated goals and objectives. Unfortunately, the rate at which the corpus of training data may evolve with new or different features, which often leads to new desired results and objectives, nearly always outpaces the rate at which a machine learning model can be trained.

According to aspects of the disclosed subject matter, the training term of a machine learning model may be significantly shortened through the use of warm-starting: imbuing the to-be-trained machine learning model with relevant information (i.e., training features) about the input data and its processing, leading to a shortened training period. Thus, instead of starting with a blank slate as with typical training of a machine learning model, relevant information about the input data and/or information on how to process the input data (or portions of the input data) to achieve the desired results, are imbued or instilled in the to-be-trained machine learning model. The instilling of this information is sometimes referred to as warm-starting. For its part, warm-starting a machine learning model is akin to moving the starting line closer to the finish line.

In accordance with various aspects and embodiments of the disclosed subject matter, systems and methods for training a second machine learning model are presented. An initial set of training features is determined from one or more analyses of the training data (or, alternatively, from the entire corpus of input data). Processing features utilized in training a first machine learning model are identified. The feature sets are combined such that at least some of the processing features are incorporated into an updated set of training features for training a second machine learning model. According to aspects of the disclosed subject matter, at least one feature of the updated set of training features is customized by a user, resulting in a set of customized training features. The training features of the set of customized training features are used to warm-start the training of a second machine learning model.

In accordance with additional aspects and embodiments of the disclosed subject matter, processing features used by a first machine learning model are accessed. An initial set of training features for training a to-be-trained second machine learning model are identified, at least in part, from training data to be used in training the second machine learning model. The training features and the processing features are combined to form a set of updated training features. At least one feature of the set of updated training features is customized by a user, resulting in a set of customized training features. Thereafter, the second machine learning model is warm-started according to the customized training features and trained. Advantageously, warm-starting the training of the second machine learning model leads to reduced time and processing bandwidth to accurately train the second machine learning model.

According to additional aspects of the disclosed subject matter, a computer system is presented, where the computer system is suitably configured to train a second machine learning model from aspects of a trained, first machine learning model, as well as training features determined from the training data for use in training the second machine learning model. In executing instructions on a processor, the computer system is configured to, at least, access processing features used in training the trained, first machine learning model. At least some of the processing features, as well as a set of initial training features determined from a corpus of input data, are combined into a set of updated training features for training the second machine learning model. At least one customization is carried out on the set of updated training features, resulting in a set of customized training features. As used herein, the set of customized training features includes both the updated training features that were customized and updated training features that were not customized, each feature of the customized training features referred to as a customized training feature.

The customized training features comprise a collection of parameters, values and/or functions including, by way of illustration and not limitation, one or more learnable and unlearnable values for training the second machine learning model. The training architecture for training the second machine learning model is "warm-started" with the customized training features and the second machine learning model is trained.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)," the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with multiple items should be viewed as meaning either or both items.

By way of definition a "feature," including a processing feature and a training feature, corresponds to an item of information, a value, and/or knowledge, that may be used by a training architecture in training a machine learning model. The term "processing features" refers to those features that were utilized in the prior training of a machine learning model, i.e., a first machine learning model, as discussed below. The term "training features" corresponds to those features that will be copied into and utilized by a training architecture in training a machine learning model, e.g., training the second machine learning model. The term "warm-starting" refers to the incorporation of training features into the training architecture for training a machine learning model.

According to aspects of the disclosed subject matter, both sets of features, i.e., training features and processing features, include learnable and unlearnable features. Learnable features are those features where the resulting value is determined through the iterative processing of the machine learning algorithms. According to various embodiments of the disclosed subject matter, learnable features are expressed in the form of a triplet: {feature_name, shape, value}. Examples of learnable features include embeddings and hidden layer parameters. Embeddings correspond to some aspect of an input item (often, but not exclusively found in all items of the input data) that is identified and utilized in the course of training, and may also be used in the processing of a trained machine learning model. An embedding may comprise, by way of illustration and not limitation, a value corresponding to an edge within an image, a value representing the dispersion of a color throughout an area of an image, or a value representing a sequence or movement of an object within various frames of a video. A hidden layer parameter corresponds to a value that is utilized by one or more hidden layers of a machine learning model to modify an interim result and/or influence the convolution of an interim result.

In contrast to learnable features, unlearnable features are those features that are not determined in the course of training the machine learning model. Vocabularies corresponding to particular features and continuous data, e.g., minimum values, maximum values, averages, standard deviations, etc., are examples of unlearnable features. Unlearnable features may be determined and/or calculated independent of the machine learning process. Learnable features and/or unlearnable features can be continuous or discrete. Continuous features correspond to a value in a range of values, while a discrete feature is a fixed value.

As discussed further below, at least some of the initial features for a second machine learning model may be matched with processing features that were used to train a first machine learning model and initialized based on information from the matching processing feature. Those initial training features that are determined to match a processing feature and that may be initialized (warm-started) based on information from the matching processing feature are referred to herein as updated training features. In addition, updated training features, and optionally initial training features that are determined to not have matching processing features may be customized by one or more users.

For updated training features that are unlearnable features, those features may be initialized based on a combination of information calculated from the input training corpus and at least some of the information from the matching processing feature. For updated training features that are learnable, those features may be initialized with information from the matching processing feature and may be further updated with information from the input training corpus. Initial features that are unlearnable and determined to not have a matching processing feature may be initialized based on information determined from the input training corpus. Finally, initial features that are learnable and determined to not have a matching processing feature may be initialized with a random value, or alternatively, with a defined value (e.g., zero) and may be further updated with information from the input training corpus.

To further appreciate aspects of the disclosed subject matter, reference is now made to the FIGs. Turning to FIG. 1, illustrated is an exemplary overall training process 100 of training a machine learning model in accordance with aspects of the disclosed subject matter. Indeed, as shown in FIG. 1, the training process 100 is configured to train an untrained machine learning model 134 operating on a computer system 136 to transform the untrained machine learning model into a trained machine learning model 134' that operates on the same or another computer system 136. In the course of training, as shown in the training process 100, at step 102, the architecture or framework for training the untrained machine learning model 134 is initialized, also referred to as warm-starting, with customized training features 130 comprising one or more of learnable and unlearnable features.

At step 104 of training process 100, training data 132, is accessed. Training data corresponds to multiple items of input data of a corpus of input data. According to aspects of the disclosed subject matter, the training data is a part of and representative of the corpus of input data which the resulting, trained machine learning model 134' will receive as input data. In various embodiments, the training data may be labeled training data, meaning that the actual results of processing of the data items of the corpus training data (i.e., whether they are valid results or invalid results) are known. Of course, in various alternative embodiments, the corpus of training data 132 may comprise unlabeled training data. Techniques for training a machine learning model with labeled data and/or unlabeled data are known in the art.

With the training data 132 accessed, at step 106 the training data is divided into training and validation sets. Generally speaking, the items of data in the training set are used to train the untrained machine learning model 134 and the items of data in the validation set are used to validate the training of the machine learning model. As those skilled in the art will appreciate, and as described below in regard to much of the remainder of training process 100, in actual implementations there are numerous iterations of training and validation that occur during the training of the machine learning model.

At step 108 of the training process, the data elements of the training set are processed, often in an iterative manner. Processing the data elements of the training set includes capturing the processed results. After processing the elements of the training set, at step 110, the aggregated results of processing the data elements of the training set are evaluated, and at step 112, a determination is made as to whether a desired accuracy level has been achieved. If the desired accuracy level is not achieved, in step 114, aspects of the machine learning model are updated in an effort to guide the machine learning model to generate more accurate results, and processing returns to step 108. Alternatively, if the desired accuracy level is achieved, the training process 100 advances to step 116.

At step 116, and much like step 108, the data elements of the validation set are processed, and the results of processing the validation set are captured and aggregated. At step 118, in regard to an evaluation of the aggregated results, a determination is made as to whether a desired accuracy level, in processing the validation set, has been achieved. At step 120, if the desired accuracy level is not achieved, processing returns to step 114, aspects of the in-training machine learning model are updated in an effort to guide the machine learning model to generate more accurate results, and processing returns to step 102. Alternatively, if the desired accuracy level is achieved, the training process 100 advances to step 122.

At step 122, a finalized, trained machine learning model 134' is generated. Typically, though not exclusively, as part of finalizing the now-trained machine learning model 134', portions of the now-trained machine learning model that are included in the model during training for training purposes may be extracted, thereby generating a more efficient trained machine learning model 134'.

Figure 2:
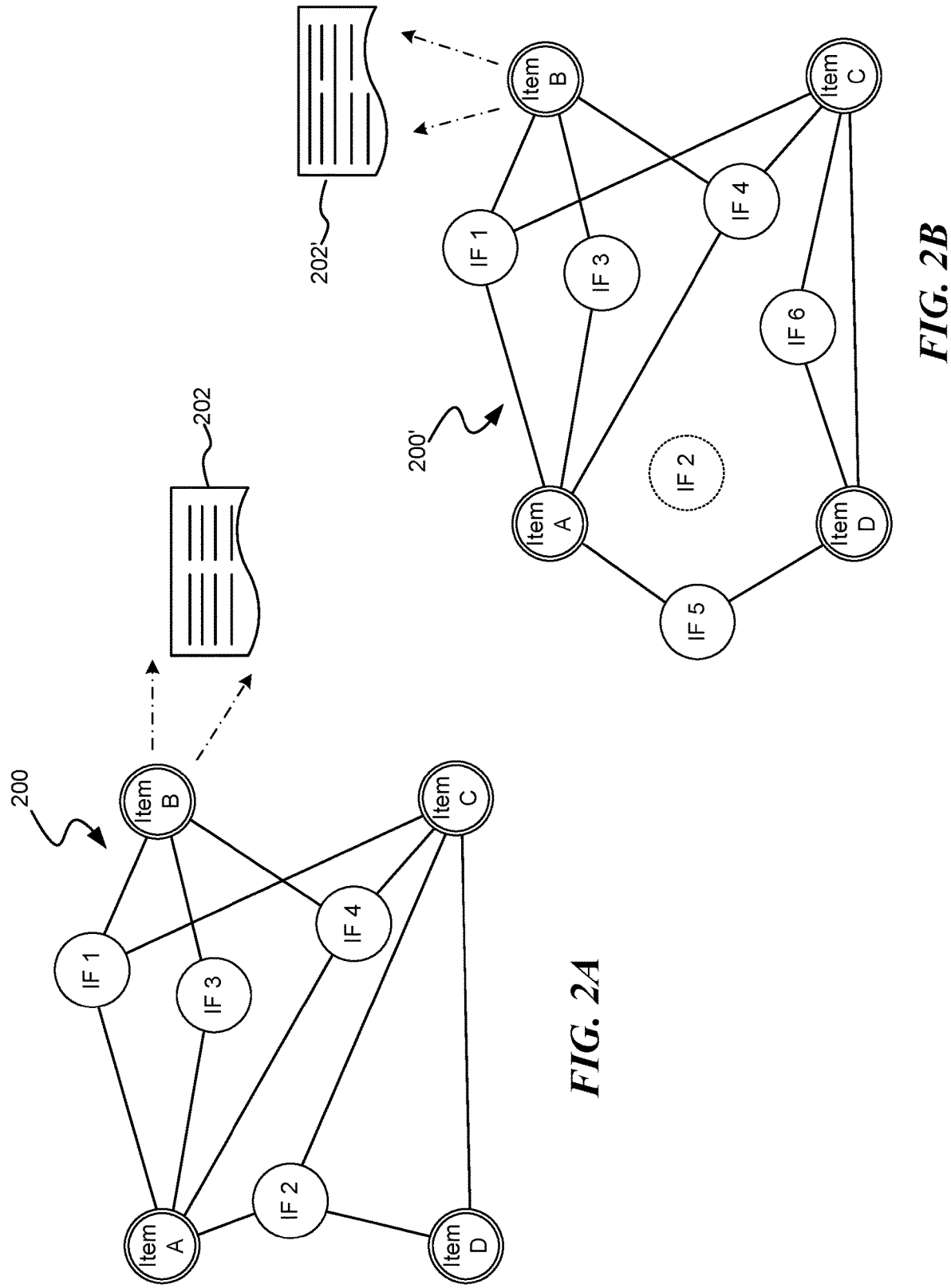
FIGS. 2A and 2B are pictorial diagrams illustrating the exemplary data items within an item graph upon which a machine learning model may be trained and/or operated, and the evolution of the item graph over time, in accordance with aspects of the disclosed subject matter.

Regarding the training data 132, and the corpus of input data more generally, reference is now made to FIGS. 2A and 2B. Indeed, FIGS. 2A and 2B are pictorial diagrams illustrating exemplary data items within an item graph upon which a machine learning model may be trained and/or operated. The data items of the item graph represent at least a portion of a corpus of input data. These figures further illustrate the evolution of an item graph and/or data items within the item graph over time, all in accordance with aspects of the disclosed subject matter.

Regarding FIG. 2A, data items (which may be included in a corpus of training data) are arranged as a segment of an item graph 200. This item graph 200 includes data items A, B, C and D, each represented as a node (each with double circles) in the item graph. According to aspects of the disclosed subject matter, each data item may be associated with item features as well as other data items, with each "association" indicated by a line. By way of example, assume that data item B corresponds to a car. Moreover, various item features such as IF 1 and IF 3 are descriptive or otherwise related to data item B. Indeed, IF 1 may correspond to a manufacturer of a car, such as Ford, while IF 3 may correspond to a model of a car, such as Mustang. Taken together, we can conclude that data item B is a Ford Mustang. Of course, there may be other features or descriptive material associated with the car/data item B that are not captured in the item graph. For example, the year of the car/data item B, the color of the car, the size of the engine, and the like. Thus, in addition to relationships to item features within the item graph, each data item may also have an associated additional data or information, as may be found in data file 202 associated with data item B. By way of illustration and not limitation, the additional data in data file 202 may include text-based metadata corresponding to data item B.

Of course, for many organizations and entities, an item graph, such as item graph 200, will often evolve over time such that new data items may be added or deleted, new item features may be added or deleted, and feature lists may be added, deleted, or modified. FIG. 2B illustrates an updated item graph 200' with new item features added, e.g., IF 5 and IF 6, while item feature IF 2 is deleted. Additionally, modifications to metadata associated with data item B will result in an updated data file 202'.

In viewing an exemplary and typical evolution of the item graph 200 to item graph 200', and assuming that a first machine learning model is trained to generate predictive results for data items of item graph 200, the modification or evolution of the item graph 200 to the updated item graph 200' may cause erroneous predicted results by the first machine learning model utilizing input data from the evolved, updated item graph 200'. This clearly indicates that an updated machine learning model is required. On the other hand, and according to aspects of the disclosed subject matter, due to similarities between item graph 200 and updated item graph 200', at least some of the processing features used by the first machine learning model could be used to advance or accelerate the training of a to-be-trained second machine learning model.

Figure 3:
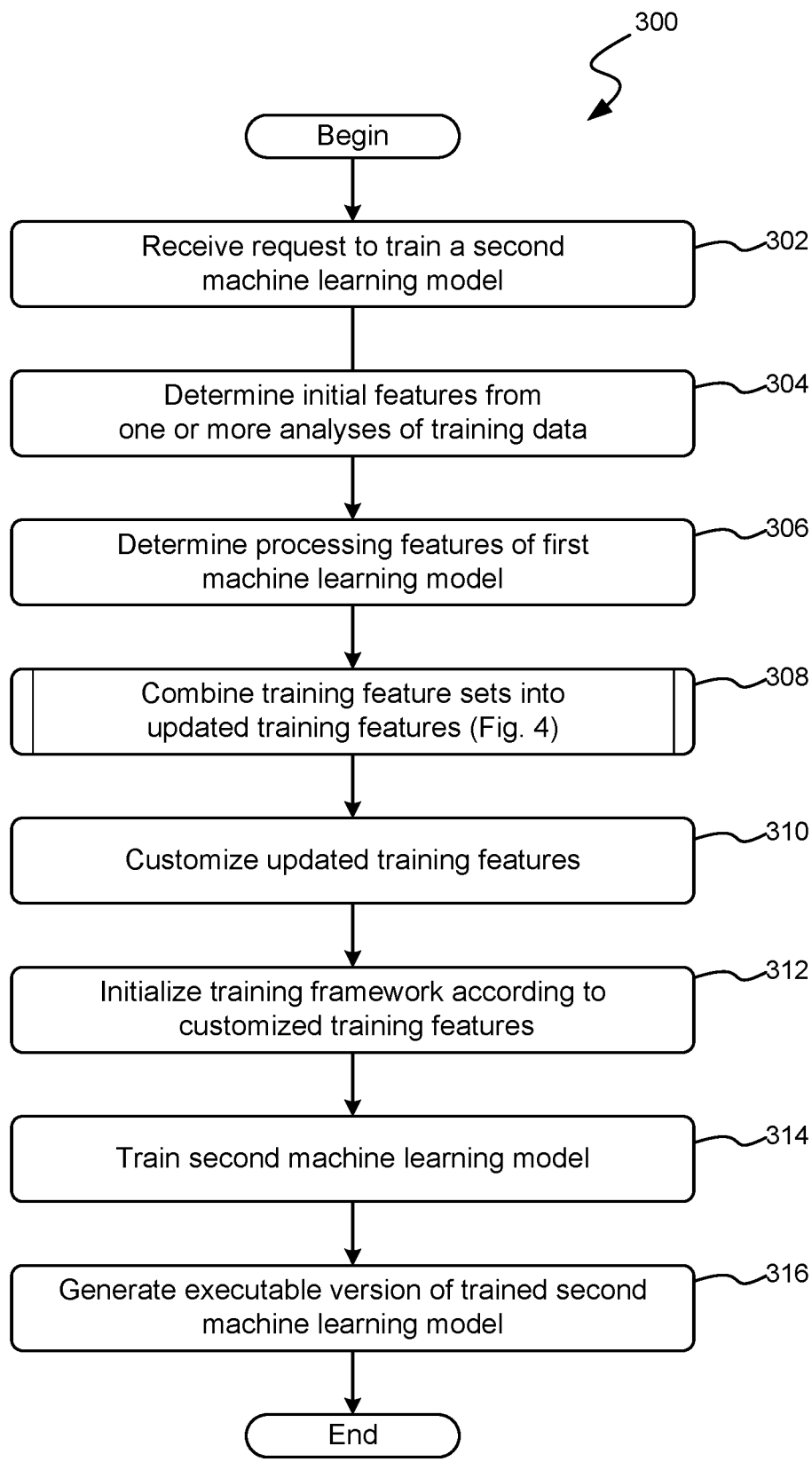
FIG. 3 is a flow diagram of an exemplary routine for training a second machine learning model based, at least in part, on initial training features and processing features of a trained, first machine learning model, in accordance with aspects of the disclosed subject matter.

Regarding the training of a machine learning model, reference is now made to FIG. 3. Indeed, FIG. 3 is a flow diagram of an exemplary routine 300 for training a second machine learning model to generate desired results according to, in part, training features determined from training data and processing features used by a training architecture in the training of a first machine learning model, and in accordance with aspects of the disclosed subject matter.

Beginning at block 302, a request to train an untrained, second machine learning model is received. At block 304, a set of initial training features for the second machine learning model are determined from one or more analyses of the training data or, in alternative embodiments, the corpus of input data. According to aspects of the disclosed subject matter, unlearnable features comprise either or both continuous and discrete feature stats that are determined from the training data. By way of illustration and not limitation, continuous feature stats may include values such as minimum values, maximum values, averages, standard deviations, and the like. Discrete feature stats will typically be associated with a vocabulary, indicative of a set of elements of which a discreate feature may be set for a particular element of training element. By way of illustration, the following table, Table 1, is illustrative of features and vocabulary:

TABLE 1

Initial Training Features

| Feature Name | Vocabulary |
| --- | --- |
| Feature1 | {A, B, C} |
| Feature2 | {D, E, F} |
| Feature3 | {G, H, I, J} |

As can be seen from Table 1, and as an example of an initial training feature determined from one or more analyses of the training data, discrete feature, "Feature1," may comprise one of the values, "A," "B," or "C."

Regarding the embeddings, and as should be appreciated by those skilled in the art, embeddings, also referred to as embedding vectors and/or feature vectors, are, essentially, a collection (i.e., a vector) of normalized features and/or aspects of a corresponding data item. These features and/or aspects are typically identified and/or determined by an "embedding generator", i.e., a trained neural network (or trained machine learning model) specifically trained to generate embeddings for an input item. Embeddings are generated by the same embedding generator and have the same dimensionality for each data item, the same number of represented features/aspects and are arranged in the same order in which the embeddings are generated. In generating the embeddings in this manner, two or more embeddings (i.e., the vectors of values) can be compared to determine similarity or dissimilarity between them. Indeed, the more two embeddings possess the same or similar values in each dimension of the vector corresponding to a particular feature that the neural network utilizes, the more similar they are. In comparing these values of features/aspects of two embeddings with n+1 elements, $$E1\begin{bmatrix} n \\ 0 \end{bmatrix}$$

and $$E2\begin{bmatrix} n \\ 0 \end{bmatrix},$$

generated by the same embedding generator (e.g., a trained neural network) on distinct input items, the more similar in values that each element is, the more similar E1 and E2 are viewed. Similarity may, also or alternatively, be determined according to a Euclidean distance measure, similarity comparisons of embedding elements, and/or cosine similarity measures.

After determining a set of initial training features, at block 306, a set of processing features corresponding to a first machine learning model is determined. According to aspects of the disclosed subject matter, processing features include those features that were or are used by a training architecture in training the trained first machine learning model on the corpus of input data. The processing features include both learnable and unlearnable variables, including either or both discrete and continuous variables or features, similar to those described above. In various embodiments, the processing features of the first machine learning model are typically, though not exclusively, obtained from an application programming interface (API) of the training architecture on which the first machine learning model was trained. By way of example, the processing features may be obtained from a TENSORFLOW architecture using a TENSORFLOW API.

At block 308, the initial training features and the processing features are combined. Combining the two sets of features is described in greater detail in regard to FIG. 4.

Figure 4:
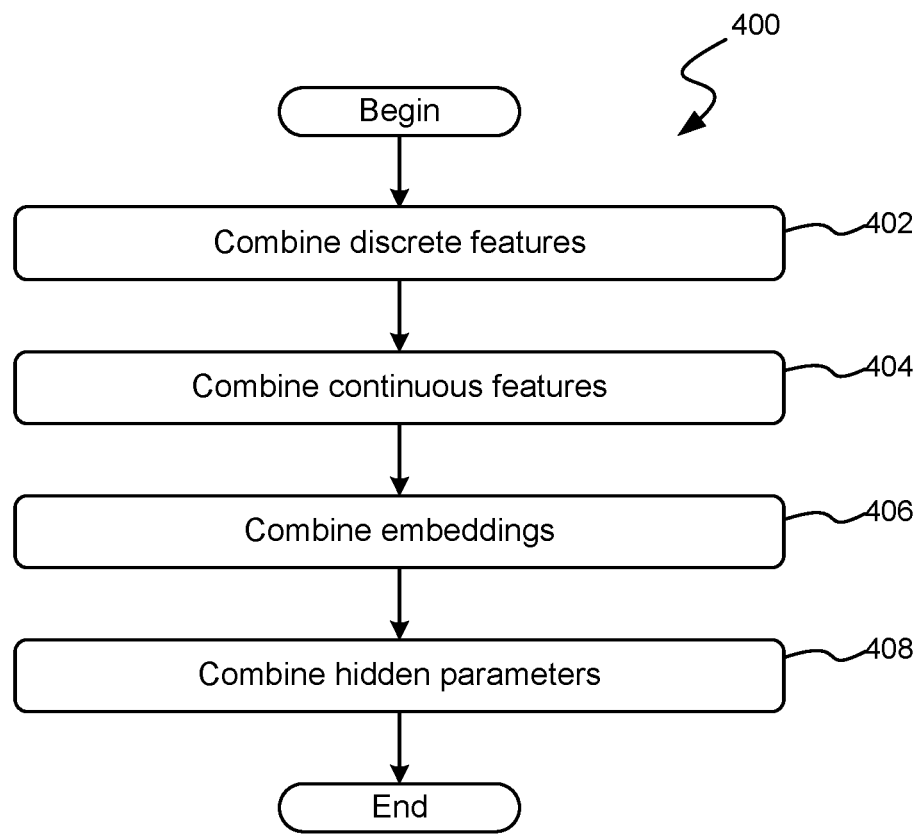
FIG. 4 illustrates an exemplary flow diagram of a routine suitably configured to combine the set of initial training features and set of processing features into a set of updated training features, in accordance with aspects of the disclosed subject matter.

Turning to FIG. 4, illustrated is an exemplary routine 400, for combining the initial training features and the processing features to form a set of updated training features.

Beginning at block 402, a combination of the discrete features and their vocabulary terms is generated. According to aspects of the disclosed subject matter, this combination includes determining an intersection between discrete features of the initial training features and discrete features of the processing features. Those discrete features, with their vocabularies, of the set of processing features that are within the intersection, are included in the updated set of training features. Discrete features of the set of initial training features are all included in the set of updated training features. In the case of the discrete features of the set of processing features that are within the intersection, the corresponding vocabularies are copied with the discrete feature to the set of updated training features. The vocabularies of these copied features may be expanded by vocabulary terms/values that were associated with the discrete feature in the set of initial training features. By way of illustration, assume that the discrete features of the set of processing features is listed in the following Table 2:

TABLE 2

Processing Features

| Feature Name | Vocabulary |
| --- | --- |
| Feature1 | {A, B, S, T} |
| Feature2 | {D, U, V, X} |
| Feature4 | {X, Y, Z} |

Assuming the initial training features mentioned above in regard to Table 1, as a result of combining these discrete features of the initial training features and the processing features illustrated in Table 2, we have the following features, as described in Table 3, as part of the set of updated features:

TABLE 3

Updated Training Features

| Feature Name | Vocabulary |
| --- | --- |
| Feature1 | {A, B, C, S, T} |
| Feature2 | {D, E, F, U, V, X} |
| Feature3 | {G, H, I, J} |

As shown in Table 3, since "Feature4" is not part of the set of initial training features, it is not included in the set of updated training features.

At block 404, the continuous feature stats of the two sets of features are combined. According to aspects of the disclosed subject matter, the continuous features of both sets of features are represented as tuples: {name, shape, value}. According to aspects of the disclosed subject matter, some features of the initial set of training features are also included in the processing features of the first machine learning model, while some features of the initial set of training features are not included in the processing features of the first machine learning model. The features of the initial set of training features that are also included in the processing features of the first machine learning model are warm-started by the corresponding features of the processing features. Features of the initial set of training features that are not also included in the processing features are not warm-started and instead calculated from the training input data.

At block 406, embeddings of the set of processing features are copied to the updated training features. As embeddings are viewed as learnable variables/features, each embedding is represented as a triplet {name, shape, value}. For each embedding of the initial set of training features the "value" is undetermined before the warm-start. In comparison, for each embedding in the processing features, the "value" is known. For embeddings of the initial set of training features that have a "name" and a "shape" that correspond or match the "name" and "shape" of an embedding of the processing features, the "value" from that corresponding embedding of the processing features is used to initialize the "value" of the matching embedding of the initial set of training features at block 312 (FIG. 3). For embeddings of the initial set of training features that do not have a corresponding embedding in the processing features with a matching "name" and "shape," the "value" for those embeddings of the initial set of training features will be initialized with a random value at block 312. In other examples, the "value" may be initialized with a defined value, such as zero. The embeddings of the initial set of training features for which the "value" is updated based on the value of a matching embedding of the processing features and the embeddings of the initial set of training features for which the "value" is not updated based on a value of an embedding of the processing features are included in the updated training features.

At block 408, hidden layer parameters are combined. As hidden layer parameters are viewed as learnable variables/features, each hidden layer parameter is represented as a triplet {name, shape, value}. For each hidden layer parameter in the initial set of training features of the second machine learning model the "value" is undetermined before the warm-start. In comparison, for each hidden layer parameter of the processing features of the first machine learning model, the "value" is known. For hidden layer parameters of the initial set of training features that have a "name" and a "shape" that correspond or match the "name" and "shape" of a hidden layer parameter of the processing features, the "value" from that corresponding hidden layer parameter of the processing features is used to initialize the "value" of the matching hidden layer parameter of the initial set of training features at block 312 (FIG. 3). For hidden layer parameters of the initial set of training features that do not have a corresponding hidden layer parameter in the processing features with a matching "name" and "shape," the "value" for those hidden layer parameters of the initial set of training features will be initialized with a random value at block 312. In other examples, the "value" may be initialized with a defined value, such as zero.

With the updated set of training features established, the routine 400 terminates.

Returning to routine 300 of FIG. 3, after identifying the updated training features for the second machine learning model, at block 310, the updated training features are presented for customization to form customized training features. Customizing the updated training features may include any one or more of removing a training feature from the set of updated training features, including or adding a training feature not previously included in the set of updated training features, and/or modifying one or more parameters of a training feature. In some implementations, initial training features that are not updated training features (because no corresponding processing feature was determined) may also be presented for customization.

In some implementations, customization may include presenting the updated training features to a user and receiving, from the user, a customization indication indicating the customization(s) to be performed with respect to the updated training features to form the customized training features. For example, a user may specify which vocabulary/continuous feature stats/embeddings/hidden layer parameters should be included or excluded, which vocabulary/continuous feature stats/embeddings/hidden layer parameters should be warm-started from the first machine learning model and/or which vocabulary/continuous feature stats/embeddings/hidden layer parameters should be initialized with a random value (or a defined value). Based on the customization indications received from the user, one or more of the updated training features are customized to form customized training features.

In some embodiments, initial training features that are not updated, because no corresponding processing feature was determined, may also be presented for customization. Similar to updated training features, the user may exclude one or more of the initial training features, modify an initial training feature, define an initial value for an initial training feature, etc.

Figure 5:
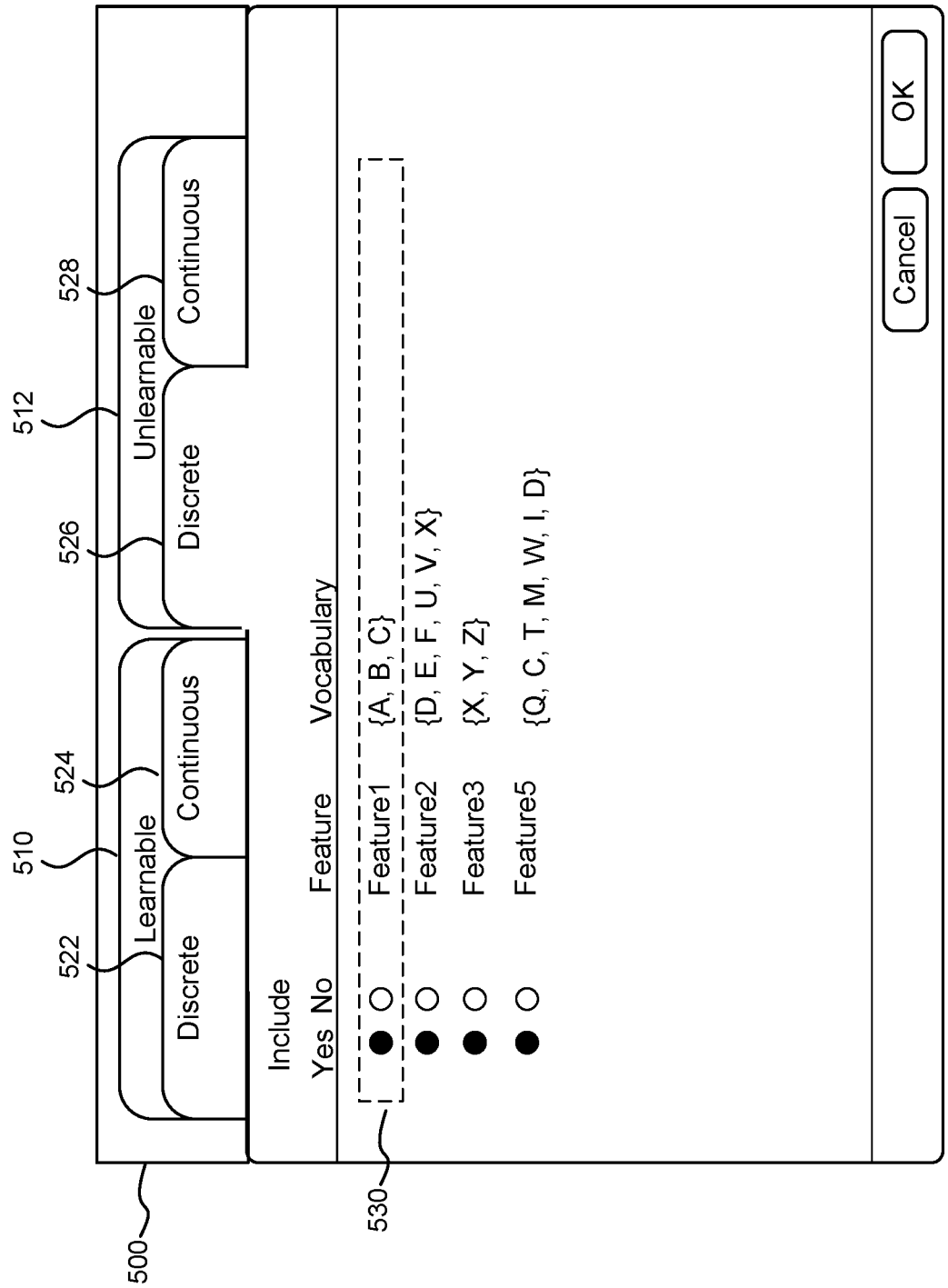
FIG. 5 is a pictorial diagram illustrating an exemplary customization interface that may be used to customize the updated set of training features in accordance with aspects of the disclosed subject matter.

By way of illustration and example, FIG. 5 is a pictorial diagram illustrating an exemplary customization interface that may be used to customize the updated set of training features. FIG. 5 includes a customization interface 500 by which a person may customize the set of updated training features. By way of example and illustration, tabs 510 and 512 correspond to learnable and unlearnable parameters, respectively. Tabs 522, 524, 526 and 528 correspond to discrete or continuous features within the learnable and unlearnable training features. Line 530 illustrates that a user may include or exclude "Feature1" from the set of customized training features, and double clicking on the line would allow the user to modify which vocabulary items are associated with Feature1. Other customizations may allow a user to establish or change one or more parameters of a feature (e.g., set the "value" field in a triplet), or even include an excluded feature in the set of updated training features to form the customized training features.

In some embodiments, the user may also specify feature name scopes, where each name scope represents multiple related individual features. For example, there may be many individual hidden layer parameters within each hidden layer. These individual hidden layer parameters may each be identified by their own "name" but may all have a same name scope. When specifying a name scope in the customization, the customization will customize each feature associated with the indicated name scope. By enabling the indication of name scopes, rather than just individual feature names, convenience and customization may be further improved.

With reference again to FIG. 3, at block 312 the training framework or architecture for training the second machine learning model is initialized with either warm-start or randomly. The decision of which training features to warm-start and which features are to be randomly initialized is determined at block 308 and may be customized or altered at block 310, as discussed above. According to various embodiments of the disclosed subject matter, this initialization includes operating with one or more API calls of a training framework or architecture, such as the TENSORFLOW architecture, to configure the framework to utilize the various features of the set of customized training features in training the second machine learning model.

At block 314, the second machine learning model is trained after the "warm-start" framework. As those skilled in the art will appreciate, the second machine learning model may be trained on a computer system or computer systems, typically utilizing one or more graphic processing units (GPUs) that are particularly useful in the course of training machine learning models. Indeed, GPU's are utilized due to their capacity to efficiently and quickly process large amounts of data, e.g., training data. Alternatively or additionally, the second machine learning model may be trained on one or more external systems, including GPU processor farms, to more efficiently carry out the numerous iterations necessary to fully train a warm-started machine learning model.

At block 316, an optional step of generating an executable version of a now-trained second machine learning model is generated. As those skilled in the art will appreciate, the executable version is the trained second machine learning model from which training abilities and features have been removed for performance purposes. Thereafter, routine 300 terminates.

Figure 6:
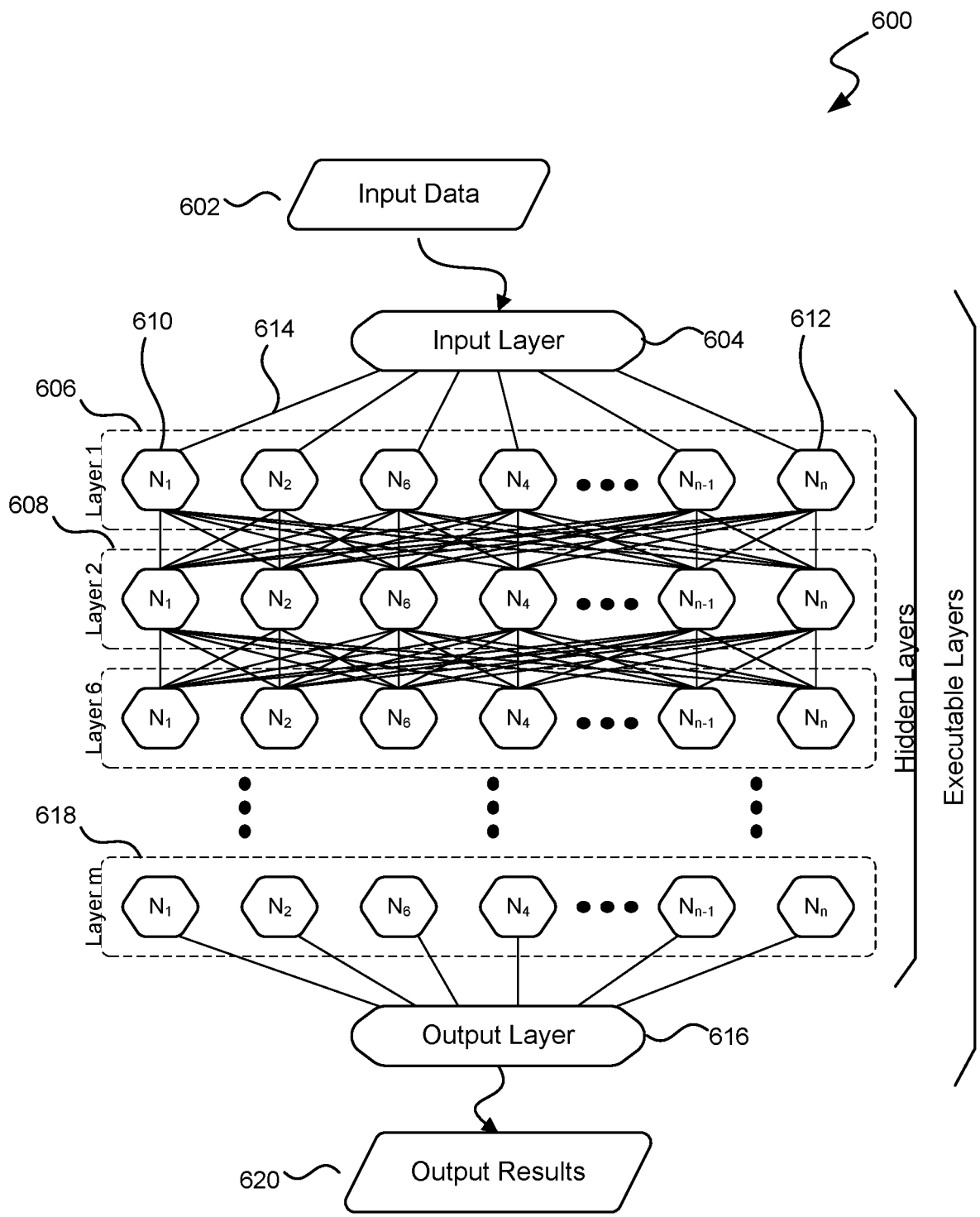
FIG. 6 is a block diagram illustrating exemplary elements of a machine learning model as may be utilized in accordance with aspects of the disclosed subject matter.

Turning now to FIG. 6, illustrated is a block diagram showing exemplary elements of a machine learning model 600, as may be trained in accordance with aspects of the disclosed subject matter. Indeed, the machine learning model 600, also called a deep neural network, comprises multiple executable layers, including an input layer 604, an output layer 616, and one or more hidden processing layers. By way of illustration, the exemplary machine learning model 600 includes m hidden processing layers, including hidden processing layers 606, 608, and 618. The input layer 604 accepts the input data 602, as described above.

The input layer 604 accepts the input data and, according to one or more predetermined algorithms and/or heuristics embedded within the various layers, processes the data, and passes the output data of the input layer to processing nodes of a first hidden processing layer 606. The output data of the first hidden processing layer 606 (with the output data not shown in FIG. 6 but implied by the various edges, such as edge 614 extending from the input layer 604 to processing nodes of the first hidden processing layer 606) are provided as input data or input values to the processing nodes of a subsequent or next hidden processing layer, such as processing nodes 610 and 612 of hidden processing layer 606.

As shown in the exemplary machine learning model 600, each hidden processing layer, including hidden processing layers 606, 608, and 618, comprises a plurality of processing, or convolutional, nodes. By way of illustration and not limitation, hidden processing layer 606 includes n processing nodes, $N_1$-$N_n$. While the processing nodes of the first hidden processing layer 606 typically, though not exclusively, have a single input value from the input layer 604, processing nodes of subsequent hidden processing layers typically have input values from one or more processing nodes of the previous input layer. Of course, in various embodiments, the processing nodes of the first hidden processing layer 606 may receive, as input values, all output values of the input layer 604.

In various embodiments and as illustrated in the executable machine learning model 600, each hidden processing layer (except for the first hidden processing layer 606) accepts input data/signals from each processing node of the prior hidden processing layer, as indicated by the edges proceeding from a processing node of an "upper" hidden processing layer to a "lower" hidden processing layer, e.g., hidden processing layer 606 is an upper hidden processing layer to hidden processing layer 608. Of course, alternative embodiments need not include such wide distribution of output values to the processing nodes of a subsequent, lower level.

Each processing node implements one or more "convolutions," "computations" or "transformations" on the input data it receives (whether the processing node receives a single-item of input data, or plural items of input data) to produce a single output value. These convolutions, projections, and/or transformations may include any number of functions or operations to generate the output data such as, by way of illustration and not limitation, data aggregations, clustering various input values, transformations of input values, combinations of plural input values, selections and/or filters among input values, mathematical manipulations of one or more input values, linear and/or multivariate regressions of the input values, statistical determinations of the input values, predictive evaluations, and the like. Moreover, individual items of input data may be weighted in any given processing node such that the weighted input data plays a greater or lesser role in the overall computation for that processing node. Items of input data may be weighted in such a manner as to be ignored in the various convolutions and computations. Processing parameters from the training criteria, also referred to as hyperparameters (data/values that are input from sources external to processing nodes of a prior input level) may also be utilized by all or some of the processing nodes of a hidden processing layer.

As will be appreciated by those skilled in the art, one of the interesting aspects of training machine learning models is that the various executable levels are adaptable to accommodate self-learning. In other words, when provided feedback, modifications are made to the weights, parameters, and processing or convolutional operations of the processing nodes in the various layers, to achieve improved, desired results.

At the final hidden processing layer, e.g., hidden processing layer 618, the processing nodes provide their output data to the output layer 616. The output layer 616 performs whatever final aggregations, convolutions, calculations, transformations, projections, normalizations and/or interpretations of the various items of input data to produce the desired output results 620.

Regarding processes and routines 100, 300, and 400 described above, as well as other routines and/or processes described or suggested herein, while these routines/processes are expressed in regard to discrete steps, these steps should be viewed as being logical in nature and may or may not correspond to any specific, actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computer system 800 described in FIG. 8 below. Additionally, in various embodiments, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code segments and/or modules comprising routines, functions, looping structures, selectors, and switches such as if-then and if-then-else statements, assignments, arithmetic computations, and the like that, in execution, configure a computing device or computer system to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single, or narrow purposed applications), and/or methods, these aspects may also be embodied as computer-executable instructions stored by computer-readable media, also referred to as computer-readable storage media, which (for purposes of this disclosure) are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer-readable media include but are not limited to: optical storage media such as BLU-RAY discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure and unless specifically stated otherwise, claims of computer-readable media expressly exclude carrier waves and/or propagated signals.

Figure 7:
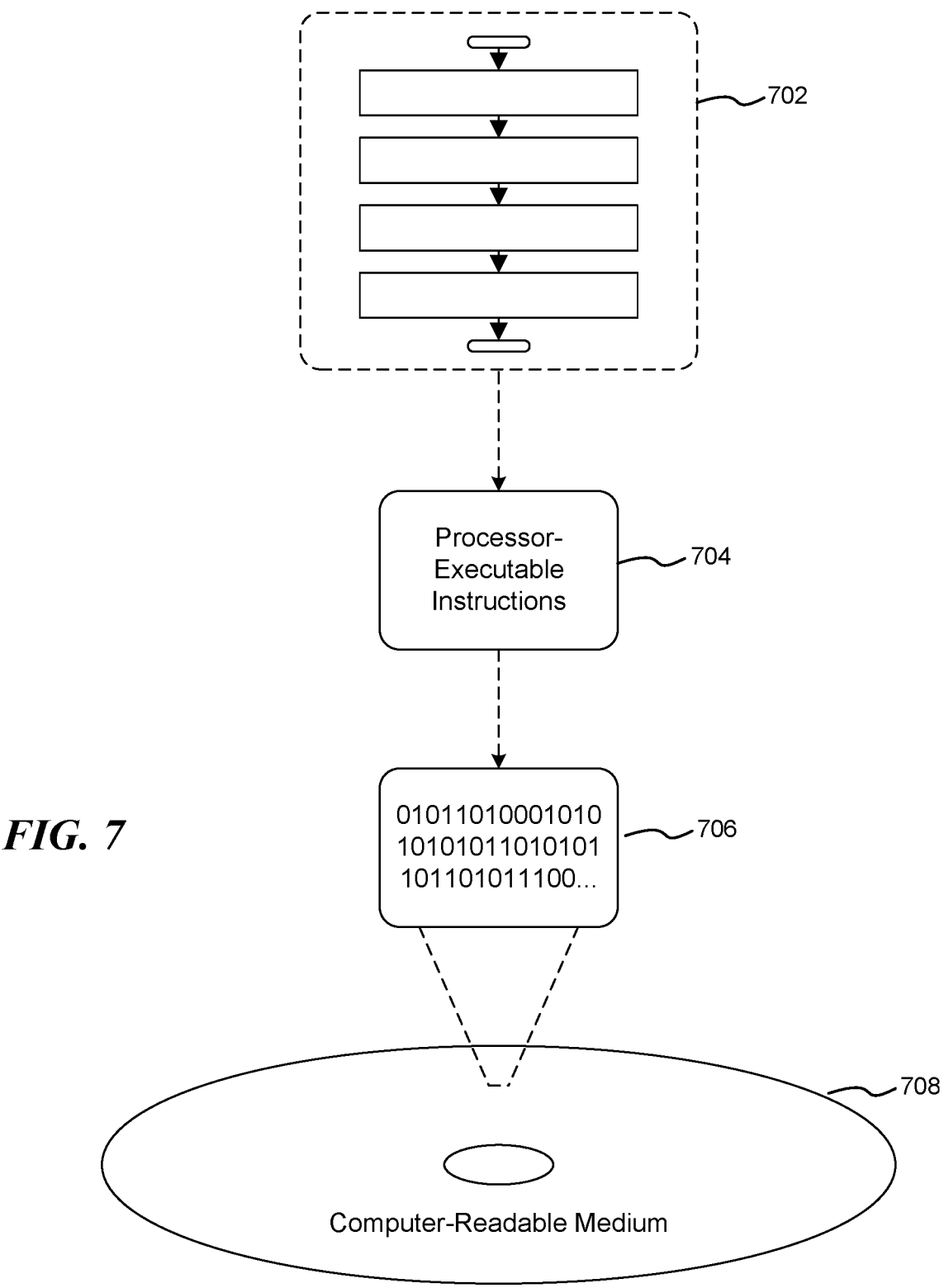
FIG. 7 is a block diagram illustrating exemplary computer-readable media encoded with instructions for training a second machine learning model according to, in part, processing features used by a trained, first machine learning model, in accordance with aspects of the disclosed subject matter.

Regarding computer-readable media, FIG. 7 is a block diagram illustrating an exemplary computer-readable medium 708 encoded with instructions for conducting one or more elements of training a second machine learning model according to at least some training criteria and/or processing layers of a trained, first machine learning model, in accordance with aspects of the disclosed subject matter. More particularly, the illustrated implementation comprises a computer-readable medium 708 (e.g., a CD-R, DVD-R or a platter of a hard disk drive), on which is encoded computer-readable data 706. This computer-readable data 706 in turn comprises a set of processor-executable instructions 704 configured to operate according to one or more of the principles set forth herein. In one such embodiment of computer-readable media 702, the processor-executable instructions 704 may be configured to perform a method, such as at least some of exemplary routines and processes 100, 300, and/or 400, for example. In another such embodiment, the processor-executable instructions 704 may be configured to implement a system on a computing system or device, such as at least some of the exemplary, executable components of computer system 800, as discussed in FIG. 8 below. Many such computer-readable media may be devised, by those of ordinary skill in the art, which are configured to operate in accordance with the techniques presented herein.

Figure 8:
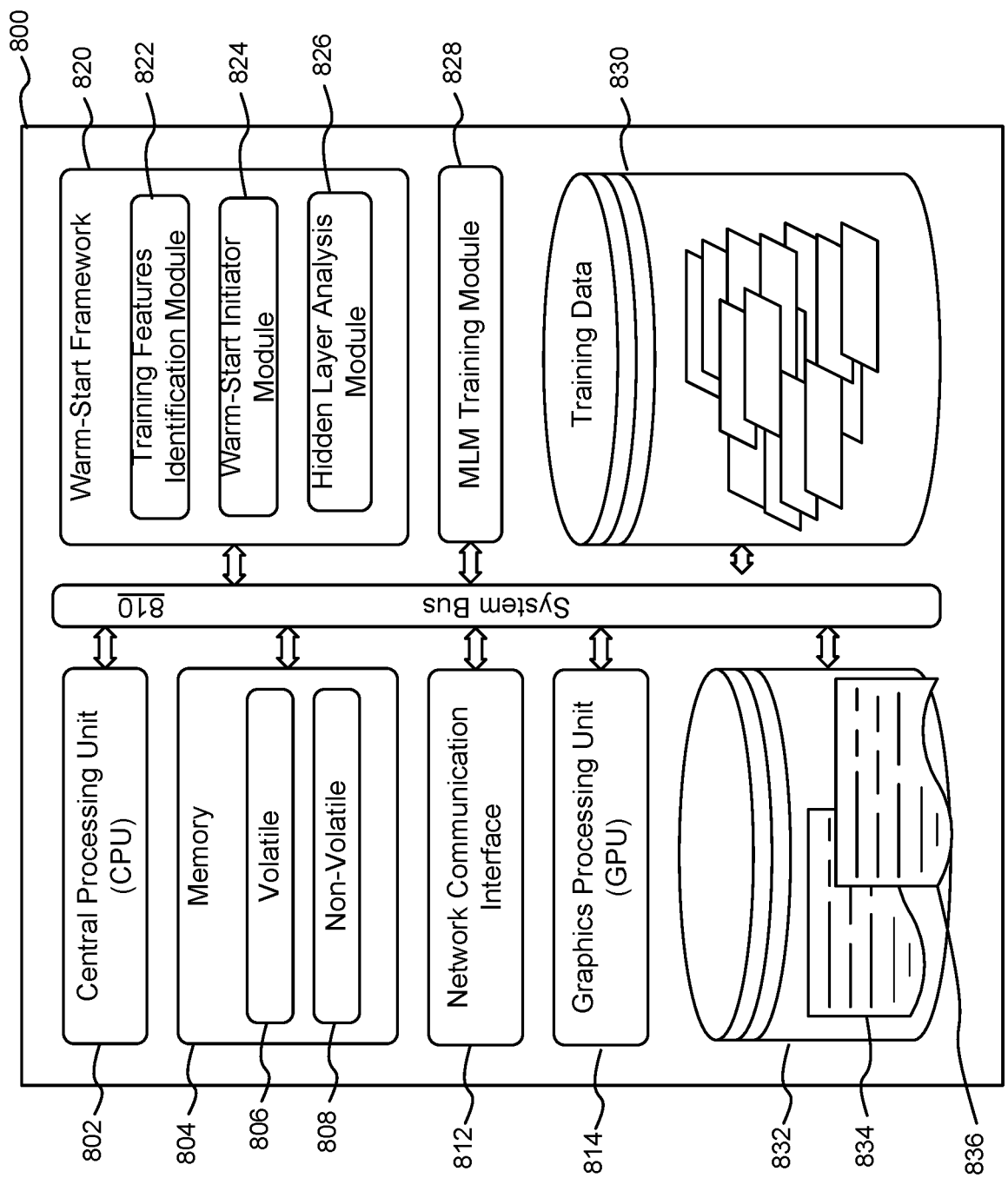
FIG. 8 is a block diagram illustrating exemplary components of a computer system suitable for training a second machine learning model according to, at least in part, processing features of a trained, first machine learning model, in accordance with aspects of the disclosed subject matter.

Turning to FIG. 8, illustrated is a block diagram showing exemplary components of a computer system 800 suitable for warm-starting and training a second machine learning model using an executable warm-start framework 820, in accordance with aspects of the disclosed subject matter. The computer system 800 typically includes one or more central processing units (or CPUs), such as CPU 802, and further includes at least one memory, such as memory 804, from which executable instructions and data may be retrieved. The CPU 802 and memory 804, as well as other components of the computing system, are typically interconnected by way of a system bus 810.

As will be appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 can store (or persist) information even when a power supply is not available. In general, RAM and CPU cache memory are examples of volatile memory 806 whereas ROM, solid-state memory devices, memory storage devices, and/or memory cards are examples of non-volatile memory 808.

As will be also appreciated by those skilled in the art, the CPU 802 executes instructions retrieved from the memory 804 from computer-readable media, such as computer-readable medium 708 of FIG. 7, and/or other executable components, in carrying out the various functions of the disclosed subject matter. The CPU 802 may be comprised of any of several available processors, such as single-processor, multi-processor, single-core units, and multi-core units, which are well known in the art.

Further still, the illustrated computer system 800 typically also includes a network communication interface 812 for interconnecting this computing system with other devices, computers and/or services over a computer network, such as the Internet. The network communication interface 812, sometimes referred to as a network interface card or NIC, communicates over a network using one or more communication protocols via a physical/tangible (e.g., wired, optical fiber, etc.) connection, a wireless connection such as Wi-Fi or BLUETOOTH communication protocols, NFC, or a combination thereof. As will be readily appreciated by those skilled in the art, a network communication interface, such as network communication interface 812, is typically comprised of hardware and/or firmware components (and may also include or comprise executable software components) that transmit and receive digital and/or analog signals over a transmission medium.

The illustrated computer system 800 also frequently, though not exclusively, includes a graphics processing unit (GPU), such as GPU 814. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data. One or more GPUs, such as GPU 814, are often viewed as essential processing components of a computing system when conducting machine learning techniques, including training a second machine learning model according to training features obtained, at least in part, from the processing features of a trained, first machine learning model. Also, and according to various embodiments, while GPUs are often included in computer systems and available for training, processing and/or implementing machine learning models, multiple GPUs are also often deployed as online GPU services or farms and machine learning processing farms.

As indicated above and according to aspects of the disclosed subject matter, the illustrated computer system 800 also includes an executable warm-start framework 820. The warm-start framework 820, in execution on the computer system, is configured to evaluate a trained, first machine learning model to identify processing features of the first machine learning model, incorporate at least some of processing features into a set of training features for warm-starting and training a second machine learning model, as set forth above in regard to routines 300 and 400.

The warm-start framework 820 is shown as including a training features identification module 822. As indicated above, the training features identification module 822, in execution on the computer system 800, is configured to obtain processing features of a trained, first machine learning model, particularly one that is configured to process or operate on the training data 830 to be used in training the second machine learning model. For illustration purposes, these processing features of the first machine learning model are illustrated as processing features 834 stored in the data store 832 of the computer system 800. According to various embodiments of the disclosed subject matter, obtaining or accessing these processing features may comprise accessing an API of a TENSORFLOW architecture, utilized in training machine learning models, to obtain processing information regarding the first machine learning model and examining the processing information to identify various vocabulary terms, static values, dynamic values, and processing layers of the first machine learning model.

In addition to identifying the processing features of the first machine learning model, the training features identification module 822, is further configured to evaluate the training data 830 upon which the second machine learning model will be trained. This evaluation is conducted to determine, at least, an initial set of training features, shown as training features 836 in data store 832. The initial set of training features may include vocabulary terms and embeddings, as well as static and dynamic values relating to the training data 830.

With both the processing features and initial training features, the training features identification module 822 is further configured to obtain a user customization of the initial training features in which a user may customize or change one or more elements of the computationally-determined initial training features for training the second machine learning model, resulting in an updated set of training features. A hidden layer analysis model, 826, in execution upon the computer system 800, is configured to evaluate the various hidden processing layers of the first machine learning model, as obtained through the API call to the architecture/module that implemented the training of the first machine learning model, to determine which, if any of the hidden processing layers of the first machine learning model may be incorporated within the training of the second machine learning model. As indicated above, where all processing features of a hidden processing layer of the first machine learning model are found in the updated set of training features for the second machine learning model, the hidden processing layer may be included in the training features for the second machine learning model, particularly for warm-starting purposes.

The warm-start framework 820 is further illustrated as including a warm-start initiator module 824. The warm-start initiator module 824, in execution on the computer system 800, is configured to incorporate the features of the second training features 836 into the to-be-trained second machine learning model. As suggested above, this incorporation may include transferring parameters into the to-be-trained machine learning model, such as the vocabulary terms of the to-be-trained machine learning model, static and dynamic training values, and/or the identified hidden processing layers, as found in the updated training features for the second machine learning model. Transfer of these training features in warm-starting the training of the second machine learning model is carried out through an API associated with the training framework, such as machine learning model ("MLM") training framework 828. In various embodiments, the MLM training framework is a TENSORFLOW architecture/framework. After initializing the MLM training framework, the warm-start initiator module 824 initiates the training of the second machine learning model via the MLM training framework 828 on the training data 830.

Regarding the various components of the exemplary computer system 800, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method, comprising:
    accessing a plurality of processing features of a first machine learning model previously trained to process input data of a corpus of input data, wherein the plurality of processing features were utilized by a training framework in training the first machine learning model;
    determining a plurality of initial training features according to one or more analyses of input data of the corpus of input data for training a second machine learning model;
    combining at least a portion of the plurality of processing features with at least a portion of the plurality of initial training features to form updated training features for training the second machine learning model, the combining comprising:
        determining discrete processing features of the plurality of processing features that correspond to discrete training features of the plurality of initial training features; and
        for each discrete processing feature having a corresponding discrete training feature:
            combining values of the discrete training feature with values of the discrete processing feature to form an updated training feature;
    customizing at least some of the updated training features to form customized training features;
    incorporating the customized training features into an executable training framework for training the second machine learning model;
    initializing the customized training features, wherein initializing includes warm-starting at least one feature of the customized training features from a processing feature of the first machine learning model; and
    executing the executable training framework to train the second machine learning model according to at least some input data of the corpus of input data.

2. The computer-implemented method of claim 1, comprising:
    determining the plurality of processing features correspond to first information that was associated with input data of the corpus of input data at a prior time period of training the first machine learning model; and
    determining the plurality of initial training features correspond to second information currently associated with input data of the corpus of input data, where the first information and the second information are different.

3. The computer implemented method of claim 2, comprising determining the plurality of processing features according to the first information and determining the plurality of initial training features according to the second information.

4. The computer-implemented method of claim 1, comprising
    determining that at least one feature of the plurality of processing features includes a first discrete feature associated with a first name and a first set of vocabulary terms; and
    determining that at least one feature of the plurality of initial training features includes a second discrete feature associated with the first name and a second set of vocabulary terms; and
    wherein the first set of vocabulary terms and the second set of vocabulary terms are different.

5. The computer-implemented method of claim 1, comprising:
    determining that the plurality of processing features include one or more first embeddings associated with items of input data of the corpus of input data; and determining that the plurality of initial training features includes a second embedding not included in the one or more first embeddings.

6. The computer implemented method of claim 1, wherein customizing at least some of the updated training features comprises:
receiving a user input identifying at least one feature of the updated training features; and
excluding the at least one feature of the updated training features to form the customized training features.

7. The computer implemented method of claim 1, wherein customizing at least some of the updated training features comprises:
receiving a user input identifying at least one feature not included in the updated training features; and
adding the at least one feature to the updated training features to form the customized training features.

8. The computer-implemented method of claim 1, wherein customizing at least some of the updated training features comprises:
receiving a user input modifying at least one feature of the updated training features; and
using the modified at least one feature to form the customized training features.

9. A computer readable medium bearing computer executable instructions which, when executed by an online service operating on a computer system comprising at least a processor, carry out a method comprising:
accessing a plurality of processing features of a first machine learning model;
determining a plurality of initial training features for training a second machine learning model to process input data of a corpus of input data, wherein the plurality of initial training features are determined based at least in part on one or more analyses of input data of the corpus of input data;
combining at least a portion of the plurality of processing features with at least a portion of the plurality of initial training features to form updated training features for training the second machine learning model, the combining comprising:
determining discrete processing features of the plurality of processing features that correspond to discrete training features of the plurality of initial training features; and
for each discrete processing feature having a corresponding discrete training feature:
combining values of the discrete training feature with values of the discrete processing feature to form an updated training feature;
customizing at least some of the updated training features to form customized training features;
initializing the customized training features; and
training the second machine learning model utilizing the customized training features.

10. The computer readable medium of claim 9, further comprising instructions that when executed perform the method further comprising:
determining the plurality of processing features correspond to first information that was associated with input data of the corpus of input data at a prior time period of training the first machine learning model; and
determining the plurality of initial training features correspond to second information currently associated with input data of the corpus of input data, where the first information and the second information are different.

11. The computer readable medium of claim 9, further comprising instructions that when executed perform the method further comprising:
determining that at least one feature of the plurality of processing features includes a first discrete feature associated with a first name and a first set of vocabulary terms; and
determining that at least one feature of the plurality of initial training features includes a second discrete feature associated with the first name and a second set of vocabulary terms; and
wherein the first set of vocabulary terms and the second set of vocabulary terms are different.

12. The computer readable medium of claim 9, further comprising instructions that when executed perform the method further comprising:
determining that the plurality of processing features include one or more first embeddings associated with one or more items of input data of the corpus of input data; and
determining that the plurality of initial training features includes a second embedding not included one or more first embeddings.

13. The computer readable medium of claim 9, wherein the initializing comprises warm-starting at least one a feature of the customized training features from a processing feature of the first machine learning model.

14. The computer readable medium of claim 9, wherein customizing comprises at least one of:
receiving a user input excluding at least one feature of the updated training features to form the customized training features;
receiving a user input including at least one feature not included in the updated training features to form the customized training features; or
receiving a user input modifying at least one feature of the updated training features to form the customized training features.

15. The computer-readable medium of claim 14, wherein modifying at least one feature comprises: changing at least one parameter of the at least one feature of the updated training features.

16. The computer readable medium of claim 9, the method further comprising:
providing at least a portion of the updated training features to a user for customization;
receiving a customization indication from the user of the updated training features; and
wherein customizing is in response to receiving the customization indication and based at least in part on the customization indication.

17. A computer system, comprising:
one or more processors; and
a memory storing program instructions that when executed by the one or more processors cause the one or more processors to at least:
access a plurality of processing features of a first machine learning model, wherein the first plurality of processing features were utilized by a training framework in training the first machine learning model;
determine a plurality of initial training features for training a second machine learning model to process input data of a corpus of input data, wherein the plurality of initial training features are determined according to one or more analyses of input data of the corpus of input data;

combine at least one feature of the plurality of processing features with at least one feature of the plurality of initial training features to form updated training features for training the second machine learning model, the combining comprising:
  determining discrete processing features of the plurality of processing features that correspond to discrete training features of the plurality of initial training features; and
  for each discrete processing feature having a corresponding discrete training feature:
    combining values of the discrete training feature with values of the discrete processing feature to form an updated training feature;
customize the updated training features to form customized training features, wherein customization of the updated training features includes at least one of:
  exclude at least one feature of the updated training features to form the customized training features;
  add at least feature that was not included in the updated training features to form the customized training features; or
  modify at least one feature of the updated training features to form the customized training features;
incorporate the customized training features into an executable training framework for training the second machine learning model;
initialize the customized training features, wherein initialization includes warm-starting at least one feature of the customized training features from a processing feature of the first machine learning model; and
execute the executable training framework to train the second machine learning model according to at least some input data of the corpus of input data.

18. The computer system of claim 17, wherein the program instructions that when executed by the one or more processors to modify the at least one feature of the updated training features further include instructions that when executed by the one or more processors further cause the one or more processors to at least:
  alter at least one parameter of the at least one feature of the updated training features.

19. The computer system of claim 17, wherein the program instructions that when executed by the one or more processors further cause the one or more processors to at least:
  receive a customization indication; and
  wherein the customization is based at least in part on the customization indication.

20. The computer system of claim 19, further comprising: receiving the customization indication from a user.

* * * * *